(12) United States Patent
Sato et al.

(10) Patent No.: US 12,130,167 B2
(45) Date of Patent: Oct. 29, 2024

(54) REMEDY WEIGHT JUDGMENT SYSTEM

(71) Applicant: Ishida Co., Ltd., Kyoto (JP)

(72) Inventors: Ryoichi Sato, Ritto (JP); Mikio Kishikawa, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 913 days.

(21) Appl. No.: 17/095,880

(22) Filed: Nov. 12, 2020

(65) Prior Publication Data

US 2021/0172787 A1 Jun. 10, 2021

(30) Foreign Application Priority Data

Dec. 6, 2019 (JP) .................................. 2019-220981

(51) Int. Cl.
| | | |
|---|---|---|
| G01G 15/00 | (2006.01) | |
| B65B 1/32 | (2006.01) | |
| B65B 57/10 | (2006.01) | |
| G01G 19/62 | (2006.01) | |

(52) U.S. Cl.
CPC ............. *G01G 15/006* (2013.01); *B65B 1/32* (2013.01); *B65B 57/10* (2013.01); *G01G 19/62* (2013.01); *G01G 2015/008* (2013.01)

(58) Field of Classification Search
CPC ...... G01G 15/006; G01G 15/00; G01G 19/62; G01G 19/393; G01G 2015/008; B65B 1/32; B65B 57/10; B65B 57/14
See application file for complete search history.

(56) References Cited

U.S. PATENT DOCUMENTS

| | | | |
|---|---|---|---|
| 4,511,010 A | 4/1985 | Sashiki et al. | |
| 5,555,439 A * | 9/1996 | Higashino | ............. G06N 3/084 |
| | | | 706/31 |
| 6,711,874 B1 * | 3/2004 | Nakagawa | ................ B65B 1/46 |
| | | | 53/64 |

(Continued)

FOREIGN PATENT DOCUMENTS

| | | |
|---|---|---|
| GB | 1 390 883 A | 4/1975 |
| JP | 4312868 B2 | 8/2009 |
| JP | 2018-017538 A | 2/2018 |

OTHER PUBLICATIONS

Del Castillo et al., Optimal Setup of a Multihead Weighing Machine, 2017, European Journal of Operational Research 259, pp. 384-393 (Year: 2017).*

(Continued)

*Primary Examiner* — Lina Cordero
*Assistant Examiner* — Lynda Dinh
(74) *Attorney, Agent, or Firm* — Studebaker & Brackett PC (57) ABSTRACT

A remedy judging system includes a weight checking device and a judgment unit. The weight checking device checks the weight of weighed product discharged from a weighing device. The judgment unit makes a judgment relating to remedies for the weighing device on the basis of "correct weight," "overweight," and "underweight" checking results, relative to a predetermined weight serving as a norm, obtained by the weight checking device. The judgment unit makes the judgment on the basis of determination patterns having an "underweight" checking result and at least one checking result that consecutively follows the "underweight" checking result.

11 Claims, 7 Drawing Sheets

(56) References Cited

U.S. PATENT DOCUMENTS 7,071,426 B2 *   7/2006   Fujii ................... G01G 19/393
                                                    177/25.18

OTHER PUBLICATIONS

The extended European search report issued by the European Patent Office on May 3, 2021, which corresponds to European Patent Application No. 20210567.2-1001 and is related to U.S. Appl. No. 17/095,880.
An Office Action; "Notice of Reasons for Refusal," mailed by the Japanese Patent Office on Sep. 5, 2023, which corresponds to Japanese Patent Application No. 2019-220981 and is related to U.S. Appl. No. 17/095,880; with English language translation.

* cited by examiner

| SAMPLE NO. | WEIGHT VALUE | CORRECT WEIGHT OR OVERWEIGHT OR UNDERWEIGHT |
|---|---|---|
| 1 | 101 | CORRECT WEIGHT |
| 2 | 99 | UNDERWEIGHT |
| 3 | 107 | OVERWEIGHT |
| 4 | 101 | CORRECT WEIGHT |

FIG. 6

| SAMPLE NO. | WEIGHT VALUE | CORRECT WEIGHT OR OVERWEIGHT OR UNDERWEIGHT |
|---|---|---|
| 1 | 101 | CORRECT WEIGHT |
| 2 | 99 | UNDERWEIGHT |
| 3 | 100 | CORRECT WEIGHT |
| 4 | 101 | CORRECT WEIGHT |

FIG. 7

| SAMPLE NO. | WEIGHT VALUE | CORRECT WEIGHT OR OVERWEIGHT OR UNDERWEIGHT |
|---|---|---|
| 1 | 101 | CORRECT WEIGHT |
| 2 | 99 | UNDERWEIGHT |
| 3 | 100 | CORRECT WEIGHT |
| 4 | 107 | OVERWEIGHT |

REMEDY WEIGHT JUDGMENT SYSTEM

BACKGROUND

Technical Field

The present invention relates to a remedy judging system.

Related Art

A packaging and weighing system is known where, as disclosed in patent document 1 (Japanese Patent No. 4,312,868), weighed product discharged from a weighing device is packaged by a packaging device and the weights of products after the packaging are checked by a weight checker. Patent document 1 discloses discriminating that the timing when bags are sealed is out of sync and reporting this in a case where an excess or deficiency in the weight of a product that was previously checked and an excess or deficiency in the weight of a product that was currently checked have a complementary relationship.

SUMMARY

Technical Problem

Patent document 1 further discloses stopping the packaging operation because of the occurrence of a clog caused by a bridge in a case where there are consecutive deficiencies in the products a predetermined number of times or more. In this case, there is more downtime in which production of the products stops.

It is a problem of the present invention to provide a remedy judging system that enables a reduction in downtime.

Solution to Problem

A remedy judging system pertaining to a first aspect includes a weight checking device and a judgment unit. The weight checking device checks the weight of weighed product discharged from a weighing device. The judgment unit makes a judgment relating to remedies for the weighing device on the basis of "correct weight," "overweight," and "underweight" checking results, relative to a predetermined weight serving as a norm, obtained by the weight checking device. The judgment unit makes the judgment on the basis of determination patterns having an "underweight" checking result and at least one checking result that consecutively follows the "underweight" checking result.

The present inventor discovered that a judgment relating to remedies for the weighing device can be made by focusing on an "underweight" checking result as a trigger and at least one checking result that consecutively follows the "underweight" checking result. In the remedy judging system of the first aspect, the judgment unit makes the judgment relating to remedies for the weighing device on the basis of determination patterns having an "underweight" checking result and at least one checking result that consecutively follows the "underweight" checking result. By implementing remedies for the weighing device on the basis of the judgment, the frequency with which production of products is stopped can be reduced. Consequently, the remedy judging system can enable a reduction in downtime.

A remedy judging system pertaining to a second aspect is the remedy judging system pertaining to the first aspect, further including a reporting unit that reports the judgment.

In the remedy judging system of the second aspect, the judgment can be more promptly made known by the reporting unit, so remedies for the weighing device can be promptly implemented. For this reason, downtime can be further reduced.

A remedy judging system pertaining to a third aspect is the remedy judging system pertaining to the first aspect or the second aspect, further including a packaging device that packages the weighed product. The judgment unit makes the judgment relating to remedies relating to the weighing device and the packaging device.

In the remedy judging system of the third aspect, even when the system further includes the packaging device, the judgment relating to remedies relating to the weighing device and the packaging device can be made.

A remedy judging system pertaining to a fourth aspect is the remedy judging system pertaining to the first aspect to the third aspect, wherein the weighing device includes a hopper that retains product that is to be weighed. The judgment unit makes the judgment relating to remedies for the hoppers.

In the remedy judging system of the fourth aspect, problems such as the timing of the opening and closing of the hopper and residual product in the hopper can be remedied.

A remedy judging system pertaining to a fifth aspect is the remedy judging system pertaining to the fourth aspect, wherein the hopper has a timing hopper that discharges the weighed product.

In the remedy judging system of the fifth aspect, the judgment unit makes the judgment relating to remedies for the timing hopper, so problems with the timing hopper can be remedied.

A remedy judging system pertaining to a sixth aspect is the remedy judging system pertaining to the fifth aspect, wherein the weighing device further includes a chute that delivers the product to the timing hopper. The remedy judging system further includes a packaging device that packages the weighed product. The judgment unit, in a case where the "underweight" checking result is consecutively followed by an "overweight" checking result, judges that residual product in the timing hopper, a delay in the discharge of the product at the chute, or clogging of the packaging device with the weighed product should be remedied.

In the remedy judging system of the sixth aspect, in a case where the "underweight" checking result is followed by an "overweight" checking result, the judgment unit judges that, as as area for remedy, the product is remaining in the timing hopper, the discharge of the product is being delayed at the chute, or the packaging device is clogged with the weighed product. For this reason, by promptly implementing a remedy for the timing hopper, the chute, or the packaging device, downtime can be further reduced.

A remedy judging system pertaining to a seventh aspect is the remedy judging system pertaining to the fourth aspect to the sixth aspect, wherein the hopper has a weigh hopper that weighs the product. The judgment unit, in a case where the "underweight" checking result is consecutively followed by all "correct weight" checking results a predetermined number of times, judges that residual product in the weigh hopper should be remedied.

In the remedy judging system of the seventh aspect, in a case where the "underweight" checking result is followed by a "correct weight" checking result and there are consecutive "correct weight" checking results a predetermined number of times, the judgment unit judges that, as an area for remedy, the product is remaining in the weigh hopper. For this reason, by promptly implementing a remedy for the weigh hopper, downtime can be further reduced.

A remedy judging system pertaining to an eighth aspect is the remedy judging system pertaining to the fourth aspect to the seventh aspect, wherein the hopper has a booster hopper that holds the product. The judgment unit, in a case where the "underweight" checking result is consecutively followed by a "correct weight" checking result and there is an "overweight" checking result within a predetermined number of times after the "correct weight" checking result, judges that residual product in the booster hopper should be remedied.

In the remedy judging system of the eighth aspect, in a case where the "underweight" checking result is followed by a "correct weight" checking result and there is an "overweight" checking result within a predetermined number of times after the "correct weight" checking result, the judgment unit judges that, as an area for remedy, the product is remaining in the booster hopper. For this reason, by promptly implementing a remedy for the booster hopper, downtime can be further reduced.

A remedy judging system pertaining to a ninth aspect is the remedy judging system pertaining to the first aspect to the eighth aspect, further including a communication unit that communicates with the weighing device and the weight checking device.

In the remedy judging system of the ninth aspect, the judgment made by the judgment unit can be sent by the communication unit to the weighing device. For this reason, the weighing device can report the judgment relating to remedies.

A remedy judging system pertaining to a tenth aspect is the remedy judging system pertaining to the first aspect to the ninth aspect, wherein the weight checking device learns the determination patterns by machine learning and accumulates determination results based on the determination patterns.

In the remedy judging system of the tenth aspect, by learning various determination patterns, the judgment unit can promptly make the judgment relating to remedies for the weighing device. For this reason, downtime can be further reduced.

Advantageous Effects of Invention

According to the present invention, a reduction in downtime can be enabled.

DETAILED DESCRIPTION

A remedy judging system 100 pertaining to an embodiment of the invention will be described below.

(1) Overview

Figure 1:
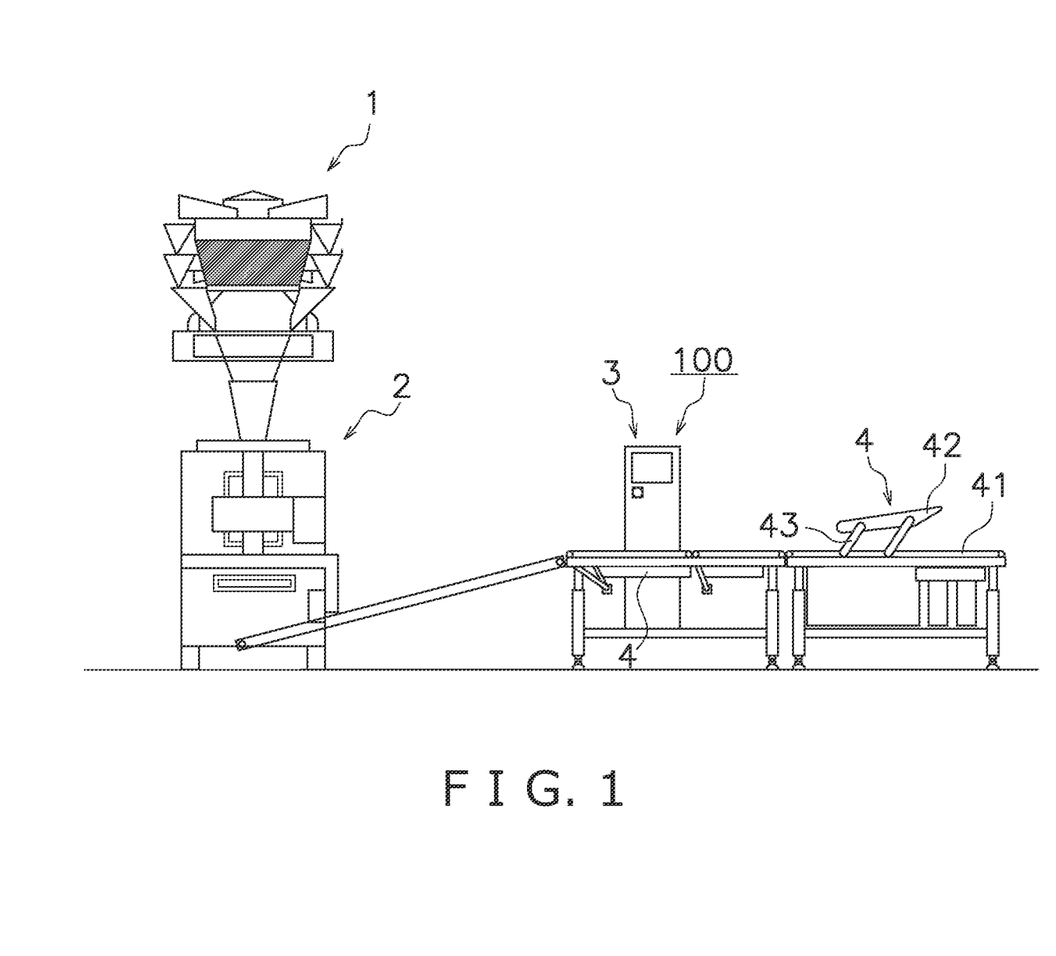
FIG. 1 is a schematic view showing an entire weighing, packaging, and checking system of an embodiment.

As shown in FIG. 1, the remedy judging system 100 is a system that makes judgments relating to remedies for a weighing device 1. The remedy judging system 100 of the embodiment includes a weighing device 1, a packaging device 2, a weight checking device 3, and a seal checking device 4 as shown in FIG. 1 and a storage unit 5, a judgment unit 6, and a reporting unit 7 as shown in FIG. 2.

The weighing device 1, the packaging device 2, the weight checking device 3, and the seal checking device 4 shown in FIG. 1 configure a weighing, packaging, and checking system that weighs, packages, and checks product. The product that is to be weighed in the weighing, packaging, and checking system is supplied to the weighing device 1. The product supplied to the weighing device 1 is divided into a predetermined weight at a time and thereafter is discharged as weighed product from the weighing device 1 and sent to the packaging device 2. In the packaging device 2, the weighed product is bag-packed in units of the predetermined weight. The weighed product packed in the bags (hereinafter also called "packages") is placed on a belt conveyor and sequentially passes through the weight checking device 3 and the seal checking device 4. During the passage, the packages undergo checks regarding their weights and seals. The checking results obtained by the weight checking device 3 and the seal checking device 4 are sent to a downstream sorting mechanism (not shown in the drawings). The sorting mechanism sorts non-defective products to a regular line conveyor (not shown in the drawings) and defective products to a defective product recovery conveyor (not shown in the drawings).

Figure 2:
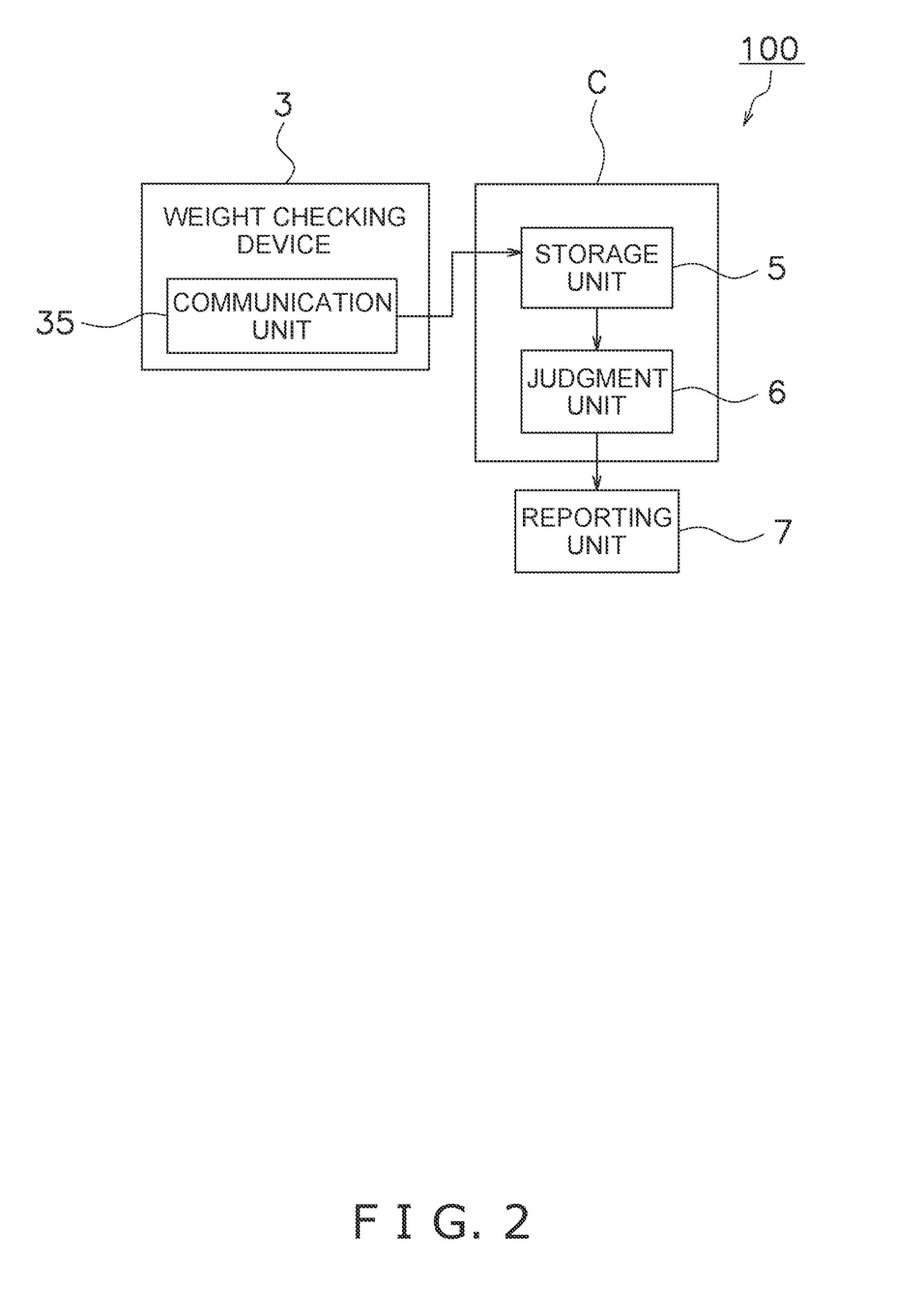
FIG. 2 is a block diagram of a remedy judging system of the embodiment.

The storage unit 5 and the judgment unit 6 shown in FIG. 2 configure a control device C utilized in the weighing, packaging, and checking system. The storage unit 5 and the judgment unit 6 are included in the control device C. A control unit of the control device C, the weighing device 1, the packaging device 2, the weight checking device 3, and the seal checking device 4 is realized by a computer. The control unit includes a processor and a storage device. For the processor, a processor such as a central processing unit (CPU) or a graphics processing unit (GPU) can be used. The processor reads programs stored in the storage device and performs predetermined processing in accordance with the programs. Moreover, the processor can, in accordance with the programs, write processing results to the storage device and read information stored in the storage device.

The reporting unit 7 is provided in a monitoring screen provided on a production line of the weighing, packaging, and checking system.

(2) Detailed Configuration (2-1) Weighing Device

Figure 3:
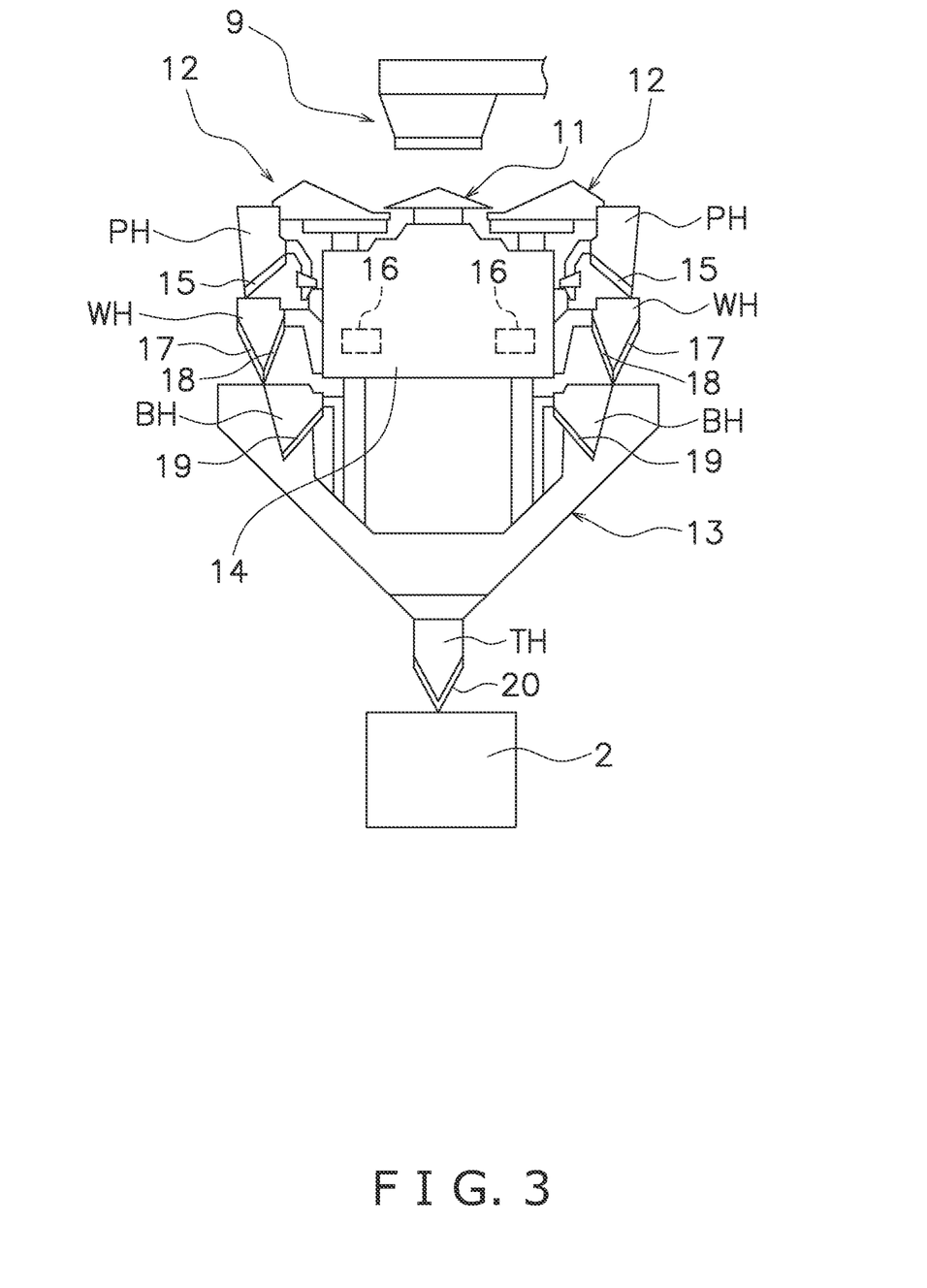
FIG. 3 is a schematic view showing a cross section of a weighing device of the embodiment.

As shown in FIG. 3, the weighing device 1 weighs, so as to meet a target weigh value, the product supplied from a conveyance unit 9, and supplies the weighed product to the packaging device 2. The product is product that varies in mass, such as agricultural products, marine products, and processed foods, for example.

The weighing device 1 of this embodiment is a combination weighing device and includes at least one hopper that retains the product that is to be weighed. Specifically, the weighing device 1 includes a dispersion table 11, supply feeders 12, pool hoppers PH, weigh hoppers WH, booster hoppers BH, a chute 13, and a timing hopper TH.

The dispersion table 11 has a conical shape and is configured to be rotatable. The product that has dropped from the conveyance unit 9 onto the dispersion table 11 is moved in the radial direction while being dispersed in the circumferential direction on the dispersion table 11 by rotation, and drops onto the supply feeders 12 disposed around the dispersion table 11.

The supply feeders 12 are vibrated by an electromagnetic vibrator (not shown in the drawings). The supply feeders 12 receive the product supplied from the dispersion table 11 and utilize vibration to cause the product they have received to move outward and drop to the downstream pool hoppers PH.

The pool hoppers PH receive, and temporarily retain, the product from the supply feeders 12. Each pool hopper PH is supported by a support member (not shown in the drawings) anchored to a body frame 14. Under each pool hopper PH is provided a gate 15 that opens and closes a discharge opening in the lower portion of that pool hopper PH. The timing of the opening and closing of each gate 15 is controlled by a controller (not shown in the drawings). When the gates 15 open, the product retained in the pool hoppers PH drops to the downstream weigh hoppers WH.

The weigh hoppers WH weigh the product. Specifically, the weigh hoppers WH are provided directly under the gates 15 and receive, and temporarily retain, the product from the pool hoppers PH. Each weigh hopper WH is supported by a support member (not shown in the drawings) anchored to the body frame 14. The weight of the product in the weigh hoppers WH is weighed by load cells 16. Under each weigh hopper WH are provided a first gate 17 and a second gate 18 that open and close discharge openings in the lower portion of that weigh hopper WH. The timing of the opening and closing of each gate 17, 18 is controlled by a controller (not shown in the drawings). When the first gates 17 open, the product retained in the weigh hoppers WH drops into the downstream chute 13. When the second gates 18 open, the product retained in the weigh hoppers WH drops into the downstream booster hoppers BH.

Each load cell 16 weighs the product being retained in the weigh hopper WH corresponding to that load cell 16. It will be noted that each load cell 16 is disposed inside the weigh hopper WH corresponding to that load cell 16.

The booster hoppers BH hold the product. Specifically, the booster hoppers BH are disposed directly under the second gates 18 and receive, and temporarily retain, the product after the weighing from the weigh hoppers WH. Each booster hopper BH is supported by a support member (not shown in the drawings) anchored to the body frame 14. Under each booster hopper BH is provided a gate 19 that opens and closes a discharge opening in the lower portion of that booster hopper BH. The timing of the opening and closing of each gate 19 is controlled by a controller (not shown in the drawings). When the gates 19 open, the product retained in the booster hoppers BH drops into the downstream chute 13.

The chute 13 is formed in a tubular shape having an inside surface with the shape of a truncated cone thattapers downward. The chute 13 is disposed in such a way that its inside surface is positioned under all the weigh hoppers WH and all the booster hoppers BH. The inside surface of the chute 13 is a surface that receives, and guides to the packaging device 2, the product discharged from the weigh hoppers WH or the booster hoppers BH.

The timing hopper TH is disposed under the chute 13. The timing hopper TH discharges the weighed product. Specifically, under the timing hopper TH is provided a gate 20 that opens and closes a discharge opening in the lower portion of the timing hopper TH. The timing of the opening and closing of the gate 20 is controlled by a controller (not shown in the drawings). In a state in which the gate 20 is closed, the timing hopper TH temporarily retains the weighed product discharged from the chute 13. When the gate 20 is opened, the timing hopper TH discharges to the packaging device 2 the weighed product it temporarily retained.

(2-2) Packaging Device

Figure 4:
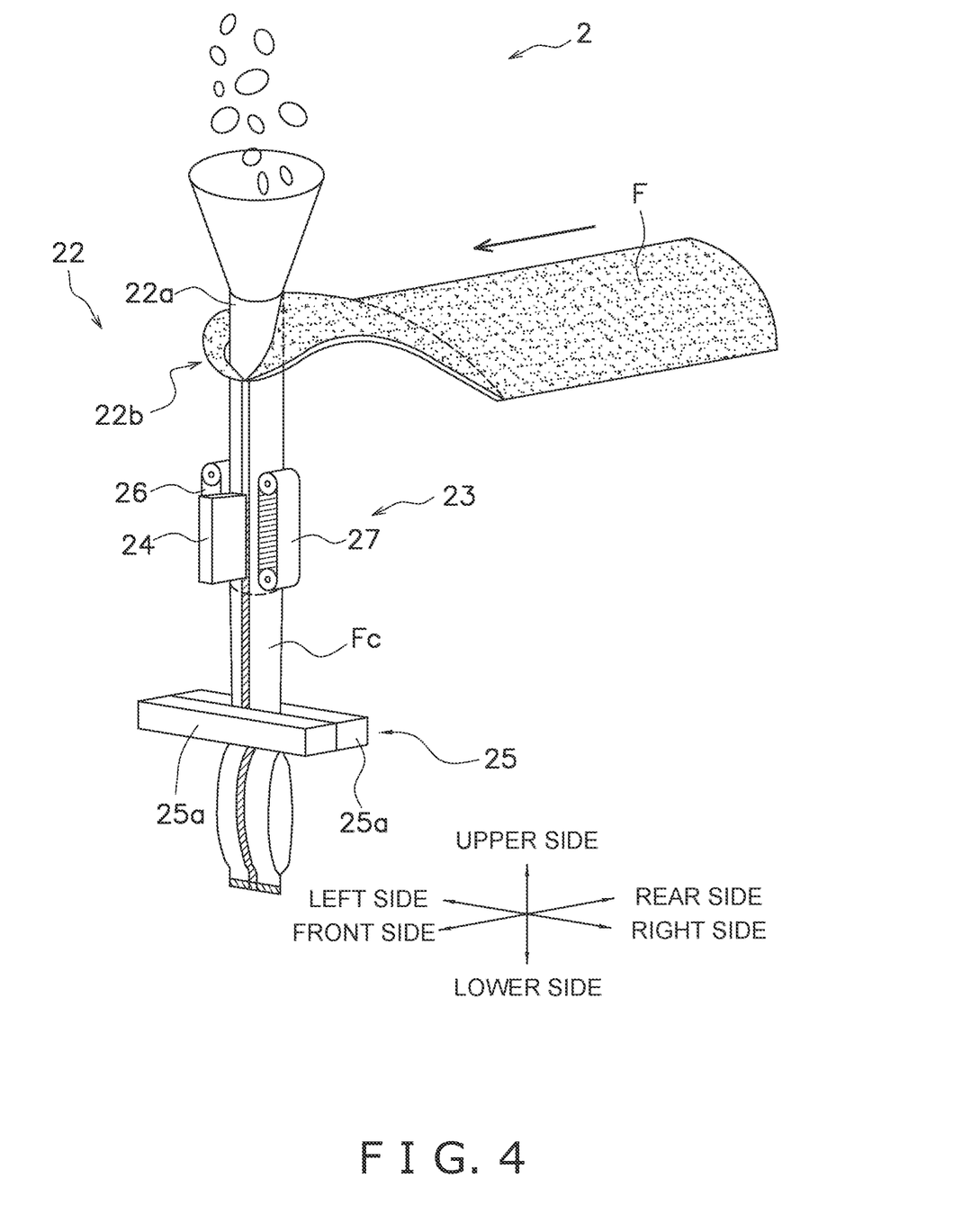
FIG. 4 is a perspective view of a packaging device of the embodiment.

The packaging device 2 packages the weighed product that has been weighed by the weighing device 1. Specifically, the packaging device 2 bag-packs the weighed product that is delivered a predetermined weight at a time from the weighing device 1. As shown in FIG. 4, the packaging device 2 includes a film supply mechanism (not shown in the drawings), a forming mechanism 22, a conveyance mechanism 23, a longitudinal sealing mechanism 24, and a transverse sealing mechanism 25.

In the film supply mechanism is set a film roll into which a film F is wound. The forming mechanism 22 forms into a cylindrical shape the sheet-like film F that is sent from the film supply mechanism. The forming mechanism 22 has a tube (cylindrical portion) 22a and a former 22b.

The tube 22a is a cylindrical member whose upper end and lower end are open, and the tube 22a extends in the longitudinal direction. The tube 22a is anchored to the former 22b via a bracket (not shown in the drawings). The weighed product that drops the predetermined weight at a time from the weighing device 1 is fed into the open portion in the upper end of the tube 22a. That is, the tube 22a is configured so that the weighed product passes through the inside of the tube 22a.

The former 22b is disposed surrounding the tube 22a near the upper portion of the tube 22a. The former 22b has a shape by which the sheet-like film F sent from the film supply mechanism becomes formed into a cylindrical shape when it passes through a clearance between the former 22b and the tube 22a. That is, the sheet-like film F becomes wrapped around the outside surface of the tube 22a and formed into a cylindrical shape when it passes through the clearance.

The conveyance mechanism 23 conveys downward the film F that has been formed into a cylindrical shape by the forming mechanism 22 (hereinafter this film F will be called "the cylindrical film Fc"). The conveyance mechanism 23 has a pair of pull-down belts 26, 27. The pull-down belts 26, 27 are disposed extending in the longitudinal direction symmetrical to each other on the right and left sides of the tube 22a that extends in the longitudinal direction. The pull-down belts 26, 27 have the role of contacting the cylindrical film Fc wrapped around the tube 22a and conveying the cylindrical film Fc downward while sucking and holding it.

The longitudinal sealing mechanism 24 seals in the longitudinal direction the overlapping portion of the cylindrical film Fc. The longitudinal sealing mechanism 24 is disposed extending in the longitudinal direction along the tube 22a. The longitudinal sealing mechanism 24 heat-seals the overlapping portion extending in the longitudinal direction of the cylindrical film Fc wrapped around the tube 22a while pushing it with a fixed pressure against the side surface of the tube 22a. The longitudinal sealing mechanism 24 has a heater and a heater belt that is heated by the heater.

The transverse sealing mechanism 25 seals the bags by sealing in the transverse direction the portions of the cylindrical film Fc that become upper and lower ends of the bags. The transverse sealing mechanism 25 is disposed under the tube 22a. The transverse sealing mechanism 25 has a front and rear pair of sealing jaws 25a.

The sealing jaws 25a have heaters inside. Sealing surfaces (surfaces that oppose each other during transverse sealing) of the sealing jaws 25a are heated by the heaters, and the cylindrical film Fc clamped by the sealing jaws 25a is heat-sealed in the transverse direction. The sealing jaws 25a are coupled to rotating shafts (not shown in the drawings) via arm members (not shown in the drawings) and revolve around the rotating shafts. The rotating shafts cause the sealing jaws 25 to revolve and perform an operation in which the sealing jaws 25 move horizontally toward and away from each other to clamp the cylindrical film Fc at an appropriate timing.

(2-3) Weight Checking Device

Figure 5:
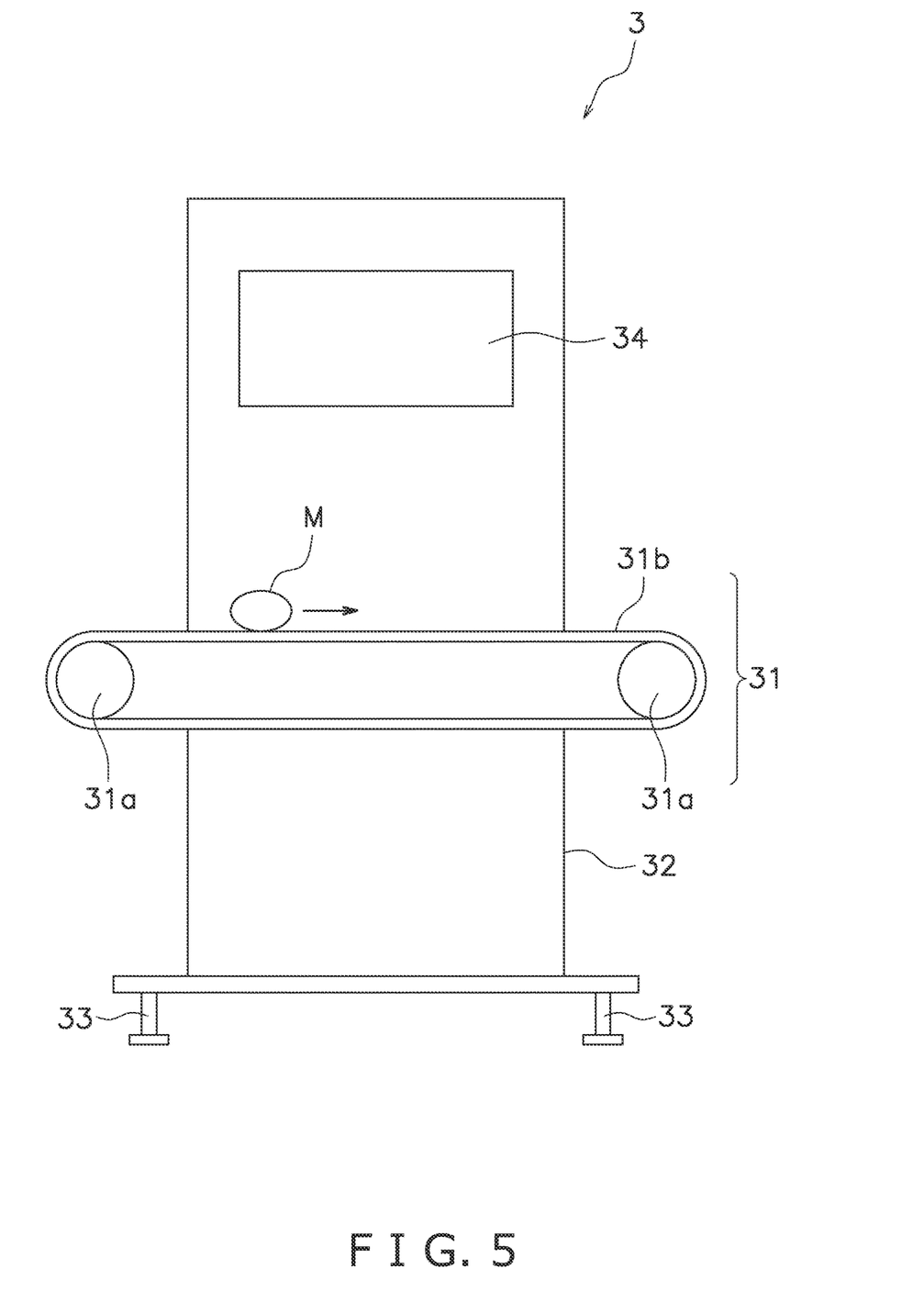
FIG. 5 is a schematic view showing the front of a weight checking device of the embodiment.

The weight checking device 3 shown in FIG. 1 and FIG. 5 checks the weight of the weighed product discharged from the weighing device 1. Here, the weight checking device 3 checks the weight of the weighed product discharged from the packaging device 2. The weight checking device 3 selects only the weighed product determined to be non-defective product and conveys it to the seal checking device 4 disposed downstream. The weight checking device 3 includes a weigh conveyor 31, a load cell (not shown in the drawings), a housing 32, legs 33, and a display unit 34 shown in FIG. 5 and a communication unit 35 shown in FIG. 2.

The weigh conveyor 31 conveys weighed product M downstream. The weigh conveyor 31 has a motor (not shown in the drawings), rollers 31a, and a belt 31b. The motor is a drive source.

The pair of rollers 31a are disposed, so as to be freely rotatable, on both ends in the horizontal direction. When one roller 31a is driven by the motor, the other roller 31a follows.

The belt 31b is entrained between the pair of rollers 31a. Here, the belt 31b is a flat belt. The belt 31b, as a result of the rollers 31a being driven by the motor, conveys forward in the horizontal direction (the direction of the arrow in FIG. 5) the weighed product M placed on the belt 31b.

It will be noted that the weight checking device 3 may further include other conveyors disposed upstream and downstream of the weigh conveyor 31 in the conveyance direction.

The load cell measures the weight of the weighed product M by detecting a change in strain caused by the weight of the weighed product M conveyed by the weigh conveyor 31.

The housing 32 is supported by the pair of legs 33 and houses the weigh conveyor 31 and the load cell.

The display unit 34 displays the checking result of the weight of the weighed product M. The display unit 34 displays the checking result in such a way that it can be recognized by sight. For example, the display unit 34 displays the value of the weight of the weighed product M and a predetermined weight serving as a norm. It will be noted that the display unit 34 may also display "correct weight," "overweight," and "underweight" checking results described later.

The communication unit 35 shown in FIG. 2 communicates with the control device C including the judgment unit 6. Here, the communication unit 35 sends the checking results obtained by the weight checking device 3 to the storage unit 5 described later.

The weight checking device 3 further includes a determination unit (not shown in the drawings). The determination unit determines "correct weight," "overweight," and "underweight" checking results relative to a predetermined weight serving as a norm. The predetermined weight serving as the norm is arbitrarily set. The predetermined weight may be a preset weight or may be based on the weight measured by the weighing device 1. In the latter case, for example, an arbitrary range is set centered on the weight of the weighed product discharged from the weighing device 1. The predetermined weight is a weight determined to be non-defective product by the weight checking device 3. The determination unit compares the weight of the weighed product M measured by the weight checking device 3 and the predetermined weight. "Correct weight" is a weight within the predetermined weight range. "Overweight" is a weight that exceeds the predetermined weight. "Underweight" is a weight that falls below the predetermined weight.

For example, in the examples shown in FIG. 6 to FIG. 8, a range of 100 to 106 is set as the predetermined weight serving as the norm, and the weight values checked by the weight checking device 3 are "correct weight" if they are in the range of 100 to 106, "overweight" if they exceed 106, and "underweight" if they fall below 100.

(2-4) Seal Checking Device

As shown in FIG. 1, the seal checking device 4 checks for seal defects in the bags that have been packed with the weighed product. Here, the seal checking device 4 checks whether or not the packages in which the weighed product has been packaged by the packaging device 2 are sealed.

The seal checking device 4 includes a conveyance unit 41, a presser 42, a parallel motion mechanism 43, and an angle of rotation detector (not shown in the drawings). The conveyance unit 41 conveys the weighed product that has been packaged. The presser 42 presses the weighed product from above. The parallel motion mechanism 43 parallel moves the presser 42. The parallel motion mechanism 43 has links joined to the presser 42. The presser 42 is attached to the parallel motion mechanism 43 so as to be freely rotatable in a predetermined angular range. When the weighed product advances, the presser 42 rises diagonally upward and presses the bag of the weighed product with its own weight.

The angle of rotation detector is provided in the rotational center of the parallel motion mechanism 43 and is, for example, a rotary encoder. The angle of rotation detector detects the angle of rotation of the parallel motion mechanism 43. The control unit of the seal checking device 4 judges that seals are defective in a case where the detected angle of rotation is smaller than an angle of rotation serving as a norm.

(2-5) Storage Unit

The storage unit 5 shown in FIG. 2 stores the checking results obtained by the weight checking device 3. Specifically, the storage unit 5 stores the checking results of consecutive weighed product checked by the weight checking device 3 together with the order in which the weighed product was checked. FIG. 6 to FIG. 8 show examples of checking results that the storage unit 5 stores.

The storage unit 5 also stores determination patterns described later. The determination patterns can be overwritten.

(2-6) Judgment Unit

The judgment unit 6 shown in FIG. 2 makes at least one judgment relating to remedies for the weighing device 1 on the basis of the "correct weight," "overweight," and "underweight" checking results, relative to the predetermined weight serving as the norm, obtained by the weight checking device 3. In this embodiment, the judgment unit 6 makes judgments relating to remedies for the weighing device 1 and the packaging device 2 on the basis of the "correct weight," "overweight," and "underweight" checking results obtained by the weight checking device 3. The judgment unit 6 makes the judgments on the basis of determination patterns having an "underweight" checking result and at least one checking result that consecutively follows the "underweight" checking result. That is, the judgment unit 6 uses an "underweight" checking result as a trigger to analyze remedies for the members configuring the weighing device 1 and the packaging device 2 from one or more checking results that consecutively follow the "underweight" checking result.

It will be noted that the judgment(s) relating to remedies for the weighing device 1 are, for example, identifications of at least one area for remedy in the weighing device 1. The judgment(s) relating to remedies for the packaging device 2 are, for example, identifications of at least one area for remedy in the packaging device 2. The remedies may be implemented by the user or may be implemented by the remedy judging system 100.

In this embodiment, the weighing device 1 includes hoppers that retain product that is to be weighed, so the judgment unit 6 makes judgments relating to remedies for the hoppers. The weighing device 1 further includes the chute 13 that delivers the product to the timing hopper TH, so the judgment unit 6 makes judgments relating to remedies for the chute 13.

Here, the determination patterns will be described by way of examples. A case where the "underweight" checking result is consecutively followed by an "overweight" checking result constitutes a first determination pattern. The first determination pattern typically is a case where the average value of consecutive "underweight" and "overweight" checking results is a "correct weight," and more typically is a case where "underweight" and "overweight" checking results alternatively follow each other. Specifically, as shown in FIG. 6, in the first determination pattern the "underweight" checking result of sample No. 2 is consecutively followed by the "overweight" checking result of sample No. 3.

A case where the "underweight" checking result is consecutively followed by all "correct weight" checking results a predetermined number of times constitutes a second determination pattern. The predetermined number of times is arbitrarily set, but typically it is two times or more. Specifically, as shown in FIG. 7, in the second determination pattern the "underweight" checking result of sample No. 2 is consecutively followed by the "correct weight" checking results of sample No. 3 and sample No. 4.

A case where the "underweight" checking result is consecutively followed by a "correct weight" checking result and there is an "overweight" checking result within a predetermined number of times after the "correct weight" checking result constitutes a third determination pattern. The predetermined number of times is one time or more. The third determination pattern typically is a case where the average value of the "underweight" checking result and the first "overweight" checking result after the "correct weight" checking result is a "correct weight." Specifically, as shown in FIG. 8, in the third determination pattern the "underweight" checking result of sample No. 2 is consecutively followed by the "correct weight" checking result of sample No. 3, which in turn is consecutively followed by the "overweight" checking result of sample No. 4. Furthermore, the average value of the "underweight" checking result of sample No. 2 and the "overweight" checking result of sample No. 4 is a "correct weight."

When an "underweight" checking result occurs, the judgment unit 6 is notified thereof. When the judgment unit 6 acquires the "underweight" checking result, it further acquires at least one checking result that consecutively follows the "underweight" checking result. Then, the judgment unit 6 reads the determination patterns from the storage unit 5 and judges to which determination pattern the consecutive checking results it has acquired correspond.

Specifically, in a case where the "underweight" checking result is consecutively followed by an "overweight" checking result (the first determination pattern), the judgment unit 6 judges that residual product in the timing hopper TH, a delay in the discharge of the product at the chute 13, or clogging of the packaging device 2 with the weighed product is to be remedied. Specifically, when the judgment unit 6 acquires the "underweight" checking result of sample No. 2 in FIG. 6, it also acquires the checking result of sample No. 3 that consecutively follows the "underweight" checking result. The judgment unit 6 that has acquired the two consecutive checking results extracts from among the determination patterns the first determination pattern which corresponds to the checking results. Because of this, the judgment unit 6 judges that residual product in the timing hopper TH, a delay in the discharge of the product at the chute 13, or clogging of the packaging device 2 with the weighed product is to be remedied.

Furthermore, in a case where the "underweight" checking result is consecutively followed by all "correct weight" checking results a predetermined number of times (the second determination pattern), the judgment unit 6 judges that residual product in the weigh hoppers WH is to be remedied. Specifically, when the judgment unit 6 acquires the "underweight" checking result of sample No. 2 in FIG. 7, it also acquires the checking results of sample No. 3 and sample No. 4 that consecutively follow the "underweight" checking result. The judgment unit 6 that has acquired the three consecutive checking results extracts from among the determination patterns the second determination pattern which corresponds to the checking results. Because of this, the judgment unit 6 judges that residual product in the weigh hoppers WH is to be remedied.

Furthermore, in a case where the "underweight" checking result is consecutively followed by a "correct weight" checking result and there is an "overweight" checking result within a predetermined number of times after the "correct weight" checking result, the judgment unit 6 judges that residual product in the booster hoppers BH is to be remedied. Specifically, when the judgment unit 6 acquires the "underweight" checking result of sample No. 2 in FIG. 8, it also acquires the checking results of sample No. 3 and sample No. 4 that consecutively follow the "underweight" checking result. The judgment unit 6 that has acquired the three consecutive checking results extracts from among the determination patterns the third determination pattern which corresponds to the checking results. Because of this, the judgment unit 6 judges that residual product in the booster hoppers BH is to be remedied.

Here, the determination patterns are machine-learned on the basis of past checking results and remedies. That is, the remedy judging system 100 learns the determination patterns by machine learning and accumulates determination results based on the determination patterns. In this embodiment, the control device C learns the determination patterns by machine learning and accumulates determination results based on the determination patterns.

(2-7) Reporting Unit

The reporting unit 7 shown in FIG. 2 reports the judgment(s) made by the judgment unit 6. The reporting unit 7 may be provided in the weight checking device 3, but here it is provided in the monitoring screen on the production line of the weighing, packaging, and checking system.

The judgment unit 6 sends the judgments made in the judgment unit 6 to the reporting unit 7. The reporting unit 7 that has received the judgment(s) reports the judgment(s). Here, the reporting unit 7 reports the area(s) for remedy in the weighing device 1 and the packaging device 2.

Figure 6:
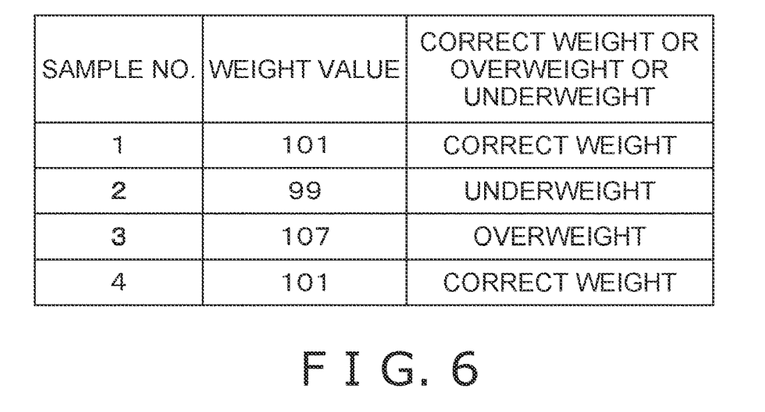
FIG. 6 is an example of checking results obtained by the weight checking device.
Figure 7:
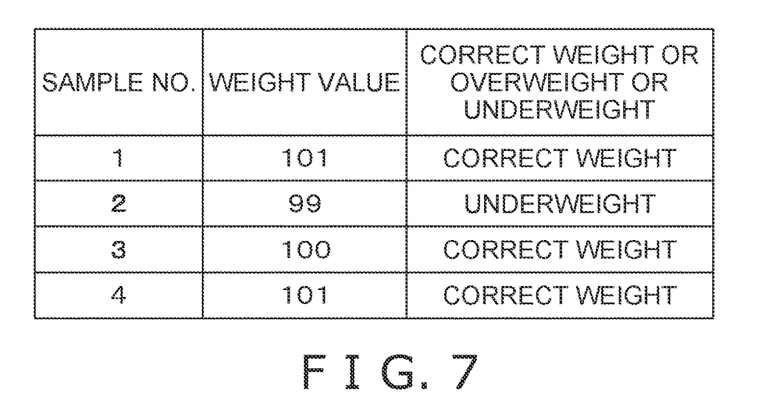
FIG. 7 is an example of checking results obtained by the weight checking device.
Figure 8:
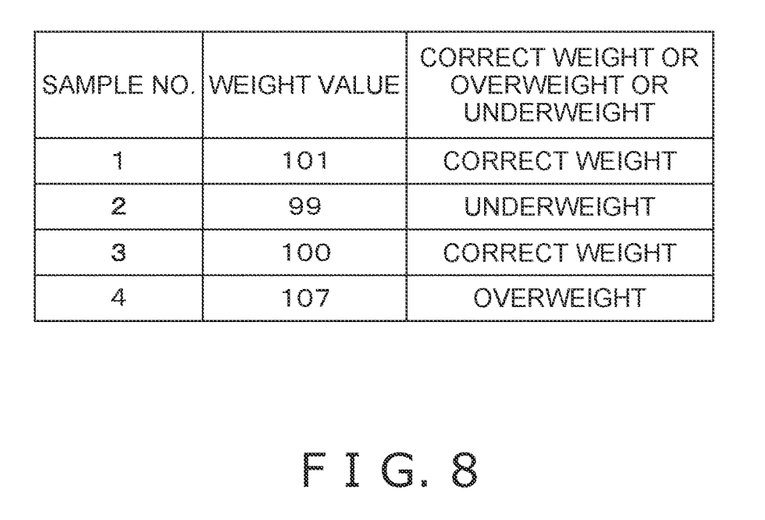
FIG. 8 is an example of checking results obtained by the weight checking device.

For example, in the case of the first determination pattern in FIG. 6, the reporting unit 7 reports at least one of "Please check to see if there is residual product in the timing hopper TH", "Please check to see if there is a delay in the discharge of the product at the chute 13", and "Please check to see if the weighed product is clogging the packaging device 2." In the case of the second determination pattern in FIG. 7, the reporting unit 7 reports "Please check to see if there is residual product in the weigh hoppers WH." In the case of the third determination pattern shown in FIG. 8, the reporting unit 7 reports "Please check to see if there is residual product in the booster hoppers BH."

(3) Operation of Weighing, Packaging, and Checking System (3-1) Operation of Weighing Device First, as shown in FIG. 3, appropriate quantities of the product are successively fed onto the dispersion table 11 from the conveyance unit 9 of the weighing device 1. The product that has been fed onto the dispersion table 11 is moved on the dispersion table 11 by the rotation of the dispersion table 11 and drops onto the supply feeders 12 disposed in a circle around the dispersion table 11. The product that has dropped onto the supply feeders 12 is moved on the supply feeders 12 by the vibration of the supply feeders 12 and drops into the pool hoppers PH disposed in a circle around the supply feeders 12. At this time, the gates 15 are in a closed state, and the product is retained in the pool hoppers PH.

Each gate 15 is controlled to open when there is no product being retained in the weigh hoppers WH disposed under those gates 15. Because of this, the product that had been retained in the pool hoppers PH is discharged into the weigh hoppers WH downstream of those pool hoppers PH. At this time, the gates 17, 18 are both in a closed state, and the product is retained in the weigh hoppers WH. The load cells 16 perform measurements at a timing when the product is being retained in the weigh hoppers WH corresponding to those load cells 16.

Each second gate 18 is controlled to open when there is no product being retained in the booster hoppers BH disposed under those gates 18. Because of this, the product that had been retained in the weigh hoppers WH is discharged to the booster hoppers BH downstream of those weigh hoppers WH. At this time, the gates 19 are in a closed state, and the product is retained in the booster hoppers BH.

New product is fed from the upstream pool hoppers PH into the weigh hoppers WH that have become empty as a result of having discharged the product to the booster hoppers BH. The weight of the new product that has been fed to the weigh hoppers WH is also measured by the load cells 16.

It will be noted that a combination computation process is executed, whereby several hoppers WH, BH are selected from among the plural hoppers WH, BH. The combination computation process involves combining and adding together the weight values of the product being retained in each weigh hopper WH and each booster hopper BH to find a product combination whose total weight value falls within a predetermined range. When several hoppers WH, BH are selected by the combination computation process, the gates 17, 19 that open and close the discharge openings in the selected hoppers WH, BH are controlled to open, and the product that had been retained in those hoppers WH, BH is discharged to the chute 13. The hoppers WH, BH that have become empty as a result of having discharged the product to the chute 13 are successively replenished with new product from the upstream hoppers PH, WH.

The product that has collected while sliding down through the inside of the chute 13 is discharged to the timing hopper TH. At this time, the gate 20 is in a closed state, and the product is retained in the timing hopper TH. The gate 20 is controlled to open in accordance with the timing when the product is to be supplied to the packaging device 2 disposed under the gate 20. Because of this, the product that had been retained in the timing hopper TH is conveyed to the packaging device 2 downstream of the weighing device 1.

(3-2) Operation of Packaging Device

As shown in FIG. 4, the conveyance mechanism 23 is driven, and the film F is paid out from the film roll of the film supply mechanism and guided to the forming mechanism 22. In the forming mechanism 22, the sheet-like film F paid out from the film roll advances along the surface of the former 22*b* and becomes wrapped around the outside surface of the cylindrical tube 22*a* and formed into the cylindrical film Fc when it passes through the clearance between the former 22*b* and the tube 22*a*. Thereafter also, the cylindrical film Fc is conveyed downward in such a way that its inside surface lies along the outside surface of the tube 22*a*. At this time, the longitudinal sealing mechanism 24 carries out heat sealing on the overlapping portion of the cylindrical film Fc that should be longitudinally sealed.

Next, the cylindrical film Fc comes off the tube 22*a* and descends to the transverse sealing mechanism 25. In the transverse sealing mechanism 25, heat sealing is carried out in the transverse direction on the portion of the cylindrical film Fc that becomes the lower end portion of the bag. At this time, a mass of the product drops through the inside of the tube 22*a* from the weighing device 1 and is collected in the cylindrical film Fc. Then, in a state in which the product has been packed inside, heat sealing is carried out in the transverse direction on the portion of the cylindrical film Fc that becomes the upper end portion of the bag, and thereafter the heat-sealed portion is cut in the transverse direction by a cutter (not shown in the drawings) built into one of the sealing jaws 25*a*. Because of this, the preceding package and the subsequent package are cut away from each other. The package that has been cut away drops onto the downstream belt conveyor.

(3-3) Operation of Weight Checking Device

The weighed product that has dropped onto the belt conveyor is conveyed to the weigh conveyor 31 of the weight checking device 3 shown in FIG. 1 and FIG. 5. In the weight checking device 3, the weight of the weighed product positioned on the weigh conveyor 31 is measured by the load cell.

(3-4) Operation of Seal Checking Device

The weighed product whose weight has been measured by the weight checking device 3 is conveyed by the conveyance unit 41 of the seal checking device 4 shown in FIG. 1. In the seal checking device 4, the presser 42 is rotated by the parallel motion mechanism 43, whereby the presser 42 presses from above the weighed product that has been packaged. At this time, the angle of rotation of the parallel motion mechanism 43 (the links) is detected by the angle of rotation detector. In a case where the detected angle of rotation is equal to or greater than the angle of rotation serving as the norm, it is judged that the seals are good and the weighed product is conveyed as a product. In a case where the detected angle of rotation is smaller than the angle of rotation serving as the norm, it is judged that the seals are defective and the weighed product is removed from the production line.

(4) Remedy Judging Method

Next, a remedy judging method of this embodiment will be described with reference to FIG. 1 to FIG. 9.

Figure 9:
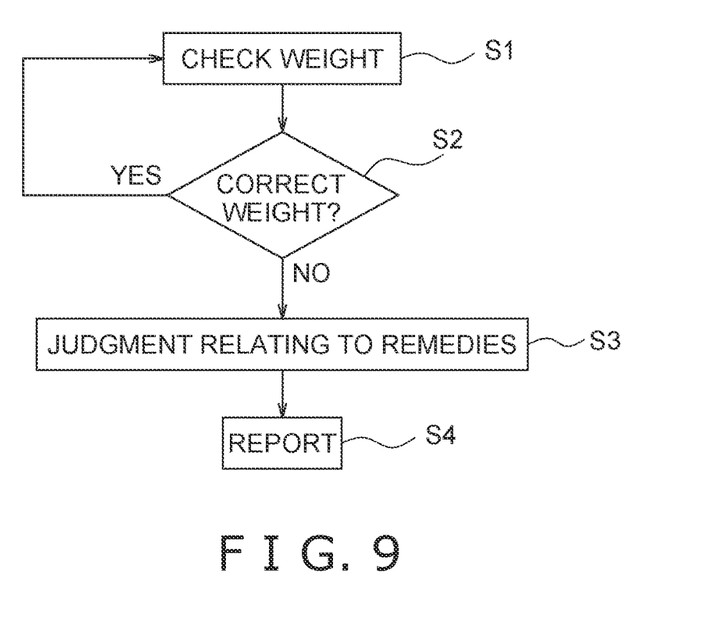
FIG. 9 is a flowchart showing a remedy judging method of the embodiment.

As shown in FIG. 5 and FIG. 9, the weight of the weighed product discharged from the weighing device 1 is checked by the weight checking device 3 (step S1). In step S1, "correct weight," "overweight," and "underweight" are output as the checking results obtained by the weight checking device 3.

Next, it is detected whether or not the checking result is "correct weight" (step S2). If the checking result is "correct weight" in step S2, the weighing device 1 and the packaging device 2 are operating normally, so the checking by the weight checking device 3 is continued.

In a case where the checking result in step S2 is not "correct weight," that is, in a case where the checking result is "underweight" or "overweight," there is an area for remedy in at least one of the weighing device 1 and the packaging device 2. For this reason, the judgment unit 6 makes a judgment relating to remedies for the weighing device 1 and the packaging device 2 on the basis of the "correct weight," "overweight," and "underweight" checking results (step S3). In step S3, the judgment unit 6 makes the judgment on the basis of the determination patterns having an "underweight" checking result and at least one checking result that consecutively follows the "underweight" checking result.

Specifically, when an "underweight" checking result occurs, at least one checking result that consecutively follows the "underweight" checking result is sent to the judgment unit 6. In accompaniment with this, the judgment unit 6 reads the determination patterns from the storage unit 5. In a case where the "underweight" checking result is followed by an "overweight" checking result as shown in FIG. 6, the judgment unit 6 judges, as areas for remedy, that the product is remaining in the timing hopper TH, the discharge of the product is being delayed at the chute 13, or the packaging device 2 is clogged with the weighed product. In a case where the "underweight" checking result is followed by a "correct weight" checking result and there are consecutive "correct weight" checking results a predetermined number of times as shown in FIG. 7, the judgment unit 6 judges that, as an area for remedy, the product is remaining in the weigh hoppers WH. In a case where the "underweight" checking result is followed by a "correct weight" checking result and there is an "overweight" checking result within a predetermined number of times after the "correct weight" checking result as shown in FIG. 8, the judgment unit 6 judges that, as an area for remedy, the product is remaining in the booster hoppers BH.

Next, the judgment made by the judgment unit 6 is reported by the reporting unit 7 (step S4). Because of the reporting unit 7, the user can know the judgment relating to remedies for the weighing device 1 and the packaging device 2.

If it is reported that the product is remaining in the weigh hoppers WH or the timing hopper TH, for example, the timing of the opening and closing of the gates 17, 18, 20 is changed. If it is reported that the discharge of the product is being delayed at the chute 13, for example, the angle of the chute 13 is changed. If it is reported that the packaging device 2 is clogged with the weighed product, the timing when the bags are sealed and coordinated timing with the weighing device 1 is changed. If there are consecutive "correct weight" checking results after implementing these changes, it can be judged that the remedy worked. It will be noted that these changes (remedies) may be implemented by the user or may be implemented by the control unit of the remedy judging system 100.

(5) Characteristics (5-1)

The remedy judging system 100 of this embodiment includes the weight checking device 3 and the judgment unit 6. The weight checking device 3 checks the weight of weighed product discharged from the weighing device 1. The judgment unit 6 makes a judgment relating to remedies for the weighing device 1 on the basis of "correct weight," "overweight," and "underweight" checking results, relative to a predetermined weight serving as a norm, obtained by the weight checking device 3. The judgment unit 6 makes the judgment on the basis of determination patterns having an "underweight" checking result and at least one checking result that consecutively follows the "underweight" checking result.

The present inventor discovered that remedies for members configuring the weighing device 1 can be analyzed by focusing on an "underweight" checking result as a trigger and at least one checking result that consecutively follows the "underweight" checking result. In this embodiment, the judgment unit 6 makes the judgment relating to remedies for the weighing device 1 on the basis of the determination patterns having an "underweight" checking result and at least one checking result that consecutively follows the "underweight" checking result. By implementing remedies for the weighing device 1 on the basis of the judgment, the frequency with which production of products is stopped can be reduced by skipping cleaning owing to the product getting stuck in the weighing device 1. Consequently, a reduction in downtime can be enabled.

(5-2)

In the embodiment, the judgment unit 6 makes a judgment relating to remedies relating to the weighing device 1 and the packaging device 2 on the basis of the determination patterns having an "underweight" checking result and at least one checking result that consecutively follows the "underweight" checking result.

Here, even when the remedy judging system 100 further includes the packaging device 2, the judgment relating to remedies relating to the weighing device 1 and the packaging device 2 that are positioned upstream of the weight checking device 3 can be made. For this reason, remedies of, for example, defects in the timing when the bags are sealed in the packaging device 2 and defects in the coordinated timing between the weighing device 1 and the packaging device 2 can be promptly implemented.

(5-3)

The present inventor also focused on determination patterns (the second and third determination patterns) where an "underweight" checking result serves as a trigger and the checking result that consecutively follows the "underweight" checking result is a "correct weight" checking result. The present inventor discovered that an area for remedy differ between a case where the "underweight" checking result is followed by an "overweight" checking result (the first determination pattern) and a case where the "underweight" checking result is followed by a "correct weight" checking result (the second and third determination patterns). Specifically, in a case where the "underweight" checking result is followed by an "overweight" checking result (the first determination pattern), the judgment unit 6 judges that there are an area for remedy such as clogging of the packaging device 2, residual in the timing hopper TH, or a delay at the chute, for example. In a case where the "underweight" checking result is followed by a "correct weight" checking result and there are consecutive "correct weight" checking results a predetermined number of times (the second determination pattern), the judgment unit 6 judges that there is an area for remedy such as residual in the weigh hoppers WH. In a case where the "underweight" checking result is followed by a "correct weight" checking result and thereafter there is an "overweight" checking result within a predetermined number of times (the third determination pattern), the judgment unit 6 judges that there is an area for remedy such as residual in the booster hoppers BH.

In this way, in the case of the second and third determination patterns, the judgment unit 6 judges that residual product in the weigh hoppers WH or the timing hopper TH is to be remedied. Because of this, remedies for the weighing device 1 can be implemented more promptly.

(6) Example Modifications

Example modifications of the above embodiment will be described below. It will be noted that some or all of the content of each example modification may also be combined with the content of the above embodiment or the content of another example modification to the extent that they do not contradict each other.

(6-1) Example Modification A

In the above embodiment, an example was described where the judgment unit 6 makes extremely precise judgments, such as remedying problems such as the timing of the opening and closing of the hoppers and residual product in the hoppers. In this example modification, the judgment unit 6 identifies only an area for remedy in the weighing device 1. In a case where the weighing device 1 includes plural hoppers (e.g., at least two of the weigh hoppers WH, the booster hoppers BH, and the timing hopper TH), the judgment unit 6 identifies which hoppers of the plural hoppers should be remedied.

(6-2) Example Modification B

In the above embodiment, an example was described where the weighing device 1 includes the pool hoppers PH, the weigh hoppers WH, the booster hoppers BH, and the timing hopper TH. The weighing device 1 may also omit at least one of the pool hoppers PH, the weigh hoppers WH, the booster hoppers BH, and the timing hopper TH. The weighing device 1 of this example modification includes the pool hoppers PH and the weigh hoppers WH but does not include the booster hoppers BH and the timing hopper TH.

(6-3) Example Modification C

In the above embodiment, the weight checking device 3 makes determinations in which it sorts the weighed product into the three categories of "correct weight," "overweight," and "underweight" relative to the predetermined weight serving as the norm. In this example modification, the judgment unit 6 makes determinations in which it sorts the weighed product into the three categories of "correct weight," "overweight," and "underweight."

Specifically, the weight checking device 3 checks the weight of the weighed product and outputs weight values. The judgment unit 6 acquires the weight values of the weighed product from the weight checking device 3 and makes determinations in which it sorts the weighed product into the three categories of "correct weight," "overweight," and "underweight" relative to the predetermined weight serving as the norm.

(6-4) Example Modification D

In the above embodiment, an example was described where the control device C learns patterns of consecutive determination results by machine learning and accumulates determination information. In this example modification, the control device C uses determination patterns based on determination information it acquires, without utilizing machine learning.

(6-5) Example Modification E

In the above embodiment and example modifications A to D, the judgment unit 6 communicates with the weight checking device 3 by means of the communication unit 35. In this example modification, the judgment unit 6 is included in the control unit of the weight checking device 3. That is, in this example modification, the communication unit 35 that communicates with the judgment unit 6 is omitted.

Specifically, the weight checking device 3 includes the storage unit 5, the judgment unit 6, and the reporting unit 7. The judgment unit 6 makes judgments relating to remedies for the weighing device 1 on the basis of the consecutive plural checking results of "correct weight," "overweight," and "underweight" obtained by the weight checking device 3 and the determination patterns read from the storage unit 5. The judgments made by the judgment unit 6 are displayed on the display unit 34 of the weight checking device 3 serving as the reporting unit 7. In this way, in this example modification, the judgments relating to remedies for the weighing device 1 are made by the weight checking device 3 alone.

Furthermore, in the above embodiment, the control device C learns the determination patterns by machine learning and accumulates determination results based on the determination patterns. In this example modification, the weight checking device 3 learns the determination patterns by machine learning and accumulates determination results based on the determination patterns.

(6-6) Example Modification F

In the above embodiment, the judgments made by the judgment unit 6 are reported to the monitoring screen on the production line of the weighing, packaging, and checking system. In this example modification, the judgments made by the judgment unit 6 are reported to at least one of the weighing device 1 and the packaging device 2 identified as an area for remedy. The weighing device 1 and the packaging device 2 have display units that report the judgments.

Figure 10:
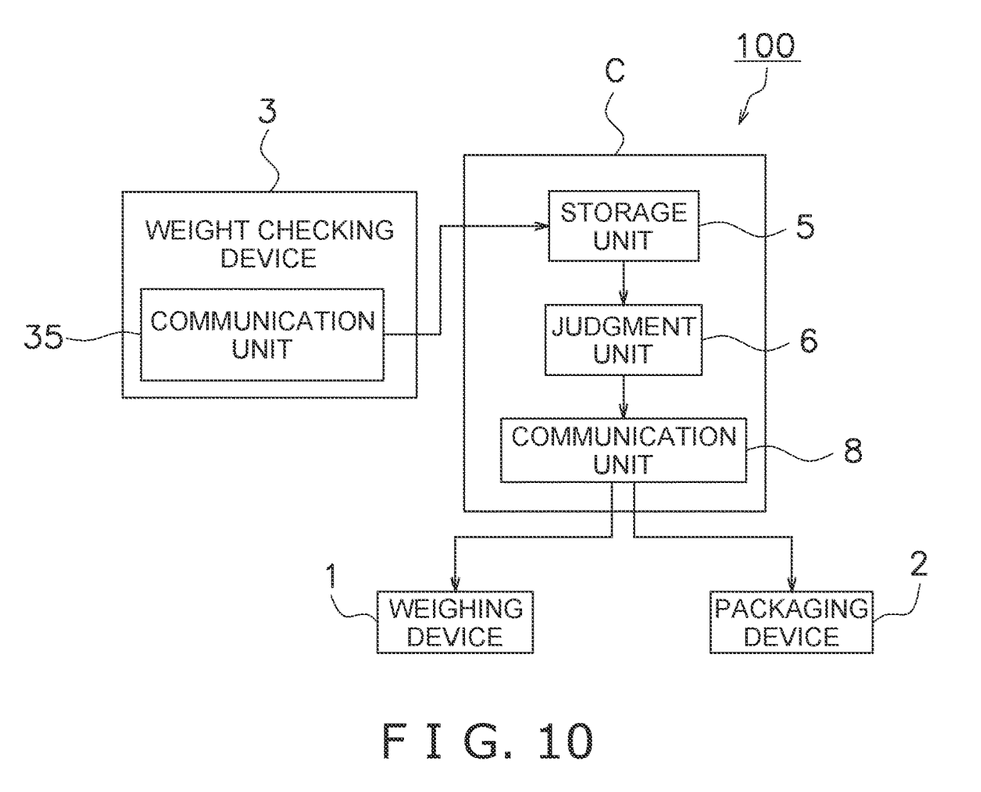
FIG. 10 is a block diagram of the remedy judging system of an example modification.

In this example modification, as shown in FIG. 10, the remedy judging system 100 includes a communication unit 8 that communicates with the weighing device 1 and the packaging device 2. Here, the communication unit 8 is included in the control device C. Specifically, the communication unit 8 allows the control device C including the judgment unit 6 to communicate with the weighing device 1 and the packaging device 2. When the judgment unit 6 makes judgments relating to remedies for the weighing device 1, the communication unit 8 sends them from the judgment unit 6 to the weighing device 1. When the judgment unit 6 makes judgments relating to remedies for the packaging device 2, the communication unit 8 sends them from the judgment unit 6 to the packaging device 2.

The communication unit 8 can also communicate with the weight checking device 3. That is, the communication unit 8 communicates with the weighing device 1, the packaging device 2, and the weight checking device 3. The communication unit 8 receives the checking results obtained by the weight checking device 3, and the storage unit 5 stores the received checking results. Utilizing the checking results acquired by the communication unit 8 from the weight checking device 3, the judgment unit 6 makes the judgments relating to remedies on the basis of the determination patterns, and the communication unit 8 reports the judgments to at least one of the weighing device 1 and the packaging device 2 in which remedies have been identified.

(6-7) Example Modification G

In the above embodiment and example modifications A to F, the remedy judging system 100 includes the packaging device 2. In this example modification, the packaging device 2 is omitted. In this case, the judgment unit 6 makes judgments relating to remedies for the weighing device 1, without making judgments relating to remedies for the packaging device 2.

It will be noted that when example modifications F and G are combined, the communication unit 8 communicates with the weighing device 1 and the weight checking device 3.

REFERENCE SIGNS LIST

1: Weighing Device
2: Packaging Device
3: Weight Checking Device
4: Seal Checking Device
5: Storage Unit
6: Judgment Unit
7: Reporting Unit
8: Communication Unit
PH: Pool Hoppers
WH: Weigh Hoppers
BH: Booster Hoppers
TH: Timing Hopper
100: Remedy Judging System

CITATION LIST

Patent Literature

Patent Document 1: Japanese Patent No. 4,312,868

What is claimed is:

1. A remedy judging system comprising:
  a weight checking device that checks the weight of weighed product discharged from a weighing device; and
  a processor that makes a judgment that comprises identification of at least one area for remedy in the weighing device on a basis of a correct weight checking result, an overweight checking result, and an underweight checking result, relative to a predetermined weight serving as a norm, obtained by the weight checking device,
  wherein the processor makes the judgment based on determination patterns having the underweight checking result and at least one checking result that consecutively follows the underweight checking result, the determination patterns including:
    a first determination pattern that the underweight checking result is consecutively followed by the overweight checking result,
    a second determination pattern that the underweight checking result is consecutively followed by all correct weight checking results a first predetermined number of times, and
    a third determination pattern that the underweight checking result is consecutively followed by the correct weight checking result and the overweight checking result within a second predetermined number of times after the correct weight checking result.

2. The remedy judging system of claim 1, wherein the processor reports the judgment.

3. The remedy judging system of claim 1, further comprising a packaging device that packages the weighed product, wherein the processor makes the judgment relating to remedies relating to the weighing device and the packaging device.

4. The remedy judging system of claim 1, wherein
  the weighing device includes a hopper that retains product that is to be weighed, and
  the processor makes the judgment relating to remedies for the hopper.

5. The remedy judging system of claim 4, wherein the hopper has a timing hopper that discharges the weighed product.

6. The remedy judging system of claim 5, wherein
  the weighing device further includes a chute that delivers the weighed product to the timing hopper,
  the remedy judging system further comprises a packaging device that packages the weighed product, and
    the processor, in a case where the underweight checking result is consecutively followed by the overweight checking result, judges that a residual product in the timing hopper, a delay in the discharge of the product at the chute, or clogging of the packaging device with the weighed product is to be remedied.

7. The remedy judging system of claim 4, wherein
  the hopper has a weigh hopper that weighs the product, and
  the processor, in a case where the underweight checking result is consecutively followed by all correct weight checking results the first predetermined number of times, judges that a residual product in the weigh hopper is to be remedied.

8. The remedy judging system of claim 4, wherein
  the hopper has a booster hopper that holds the product, and
  the processor, in a case where the underweight checking result is consecutively followed by the correct weight checking result and there is the overweight checking result within the second predetermined number of times after the correct weight checking result, judges that a residual product in the booster hopper is to be remedied.

9. The remedy judging system of claim 1, wherein the processor communicates with the weighing device and the weight checking device.

10. The remedy judging system of claim 1, wherein the weight checking device learns the determination patterns by machine learning and accumulates determination results based on the determination patterns.

11. The remedy judging system of claim 1, wherein, in response to an occurrence of the underweight checking result, the processor makes the judgment based on the determination patterns having the underweight checking result and at least one checking result that consecutively follows the underweight checking result.

* * * * *